United States Patent [19]

Eyal

[11] Patent Number: 5,958,353
[45] Date of Patent: Sep. 28, 1999

[54] METHOD FOR REDUCING ATMOSPHERIC POLLUTION

[75] Inventor: Aharon Eyal, Rachel, Israel

[73] Assignee: Clue, Bergen, Norway

[21] Appl. No.: 08/436,392

[22] PCT Filed: Nov. 23, 1993

[86] PCT No.: PCT/GB93/02406

§ 371 Date: Jul. 27, 1995

§ 102(e) Date: Jul. 27, 1995

[87] PCT Pub. No.: WO94/12266

PCT Pub. Date: Jun. 9, 1994

[30] Foreign Application Priority Data

Nov. 29, 1992 [IL] Israel .......................................... 103918

[51] Int. Cl.⁶ ............................ B01D 53/50; B01D 53/62
[52] U.S. Cl. .................. 423/234; 423/243.06; 423/312; 423/397; 423/470; 423/471
[58] Field of Search ............... 423/431, 243.06, 423/234, 519, 519.2, 397, 470, 312, 244.08, 420, 471

[56] References Cited

U.S. PATENT DOCUMENTS

| | | | |
|---|---|---|---|
| 986,204 | 3/1911 | Nydegger | 423/397 |
| 3,321,269 | 5/1967 | Yasui et al. | 423/431 |
| 3,510,253 | 5/1970 | Fattinger | 423/243.06 |
| 3,632,306 | 1/1972 | Villiers-Fisher | 423/244.08 |
| 3,989,464 | 11/1976 | Dahlstrom et al. | 422/170 |
| 4,004,966 | 1/1977 | Matty et al. | 423/243.06 |
| 4,073,634 | 2/1978 | Pircon et al. | 423/243.08 |
| 4,164,554 | 8/1979 | Kulik | 423/243.08 |
| 4,201,759 | 5/1980 | Clark | 423/431 |
| 4,231,995 | 11/1980 | Campbell et al. | 423/243.06 |
| 4,248,842 | 2/1981 | Kaupisch et al. | 423/547 |
| 4,252,553 | 2/1981 | Pircon et al. | 71/37 |
| 4,510,124 | 4/1985 | Sears et al. | 423/437 |
| 4,590,048 | 5/1986 | Spitz | 423/243.06 |
| 4,847,057 | 7/1989 | Brugerolle et al. | 423/234 |
| 5,407,655 | 4/1995 | Sarritzu | 423/420 |

FOREIGN PATENT DOCUMENTS

| | | | |
|---|---|---|---|
| 0005301 | 11/1979 | European Pat. Off. | |
| 487102 | 5/1992 | European Pat. Off. | |
| 73-42263 | 6/1975 | France | |
| 2620351 | 3/1989 | France | |
| 2447751 | 10/1974 | Germany | |
| 2530538 | 1/1977 | Germany | 423/243.06 |
| 3217394 | 11/1983 | Germany | |
| 50-136283 | 10/1975 | Japan | |

*Primary Examiner*—Wayne Langel
*Assistant Examiner*—Peter Di Mauro
*Attorney, Agent, or Firm*—Nims, Howes, Collison, Hansen & Lackert

[57] ABSTRACT

The invention provides a method for reducing atmospheric pollution caused by a pollutant selected from the group consisting of $CO_2$, $SO_2$ and a mixture thereof, the pollutant being contained in industrial gases being emitted to the atmosphere, through the conversion of $CO_2$ to calcium carbonate and the conversion of $SO_2$ to calcium sulfite using conventionally available calcium salt-containing reactant; said method comprising reacting the pollutant-containing gas, prior to the venting thereof to the atmosphere, with an alkali base and an aqueous liquor, whereby the pollutant reacts with the base and transfers to the liquor, and the resulting gas vented to the atmosphere has a reduced pollutant content; and reacting the pollutant-loaded liquor with a calcium salt-containing reactant to form calcium carbonate and calcium sulfite respectively, with the co-formation of a commercially utilizable salt containing an anion from the calcium salt reactant and a cation from the alkali base.

20 Claims, No Drawings

METHOD FOR REDUCING ATMOSPHERIC POLLUTION

The present invention relates to a method for reducing atmospheric pollution caused by a pollutant selected from the group consisting of $CO_2$, $SO_2$, and a mixture thereof.

More particularly, the present invention relates to a method for reducing atmospheric pollution caused by $CO_2$ contained in industrial gases, such as in flue gases produced by combustion powered gas turbines, through the conversion of $CO_2$ to $CaCO_3$ utilizing commercially available calcium salts, and to a method for reducing atmospheric pollution caused by $SO_2$ contained in industrial gases through the conversion of $SO_2$ to calcium sulfite, utilizing commercially available calcium-containing salts.

Carbon dioxide is one of the greenhouse gases, i.e., it is one of those gases considered to be a major threat to the environment, due to the greenhouse effect attributable thereto.

As reported in "Costs of Curbing $CO_2$ Emissions Analyzed", C & En, page 4 (May 18, 1992), the annual damage to the U.S. economy from the doubling of $CO_2$ emission (expected to occur between 2025 and 2050), would be about $60 billion, or 1% of the gross domestic product.

Two bills that aim to stabilize carbon dioxide at 1990 levels by 2000 have been introduced in the Congress of the U.S. An amendment to the energy bill introduced would stabilize greenhouse emissions.

In fiscal year 1992, the U.S. Department of Energy's Office of Industrial Technologies proposed several awards totaling $550,000, for initial R&D work on innovative concepts to utilize waste $CO_2$.

In the prior art there are many suggested methods for separating carbon dioxide from gases containing the same.

Thus, the following prior art processes have been proposed:

a) Mono- and Di-ethanolamine Processes;
b) Hot Carbonate Process;
c) Sulfinol Process;
d) Selexol Process; and
e) Modified Selexol-ammonia process.

All of the above processes are characterized by absorption, desorption, and condensation. Most of them have been developed to deal with situations in which there is a local need for $CO_2$, and they therefore are designed to utilize locally-produced $CO_2$ as opposed to bringing $CO_2$ to the site where it is required. An example of such a situation is one in which $CO_2$ is required for the production of sodium bicarbonate. These processes, however, were not designed to provide a solution for reducing atmospheric pollution caused by $CO_2$, and they were not designed to provide a sink for $CO_2$ enabling the disposal thereof.

All of these processes involve the use of a recyclable absorber, such as mono- and di-ethanolamine, potassium carbonate, dimethylether or polyethylene glycol. They further require make up of reagents due to carryover losses which occur during the various stages, as well as due to chemical degredation and oxidation. All of these processes suffer from limited absorption capability, since they are based on absorption followed by desorption, and thus a strong absorbent, which would otherwise be desirable, results in unacceptable energy requirements for effecting the desorption therefrom.

Furthermore, since all of these processes involve several stages, all involving gas treatment, the volumes required for effecting these various stages is prohibitive.

It should also be realised that combined processes involving absorption and desorption require energy consumption, at least for the desorption step.

Thus, despite the existence of these various processes, more practical and economical processes are still required since it is known, e.g., that for lack of a solution for the removal of polluting $CO_2$ gas from flue gases produced by the combustion-powered gas turbine used in the off-shore drilling rigs in the North Sea oil fields, in the range of sixty million dollars are paid annually.

However, despite this enormous financial incentive, the prior art has yet to provide a solution for providing a non-hazardous $CO_2$ sink applicable to such situations.

Similarly, sulfur and nitrogen in oil or coal result in sulfur dioxide ($SO_2$) and various nitrogen oxides ($NO_x$) in addition to carbon dioxide ($CO_2$) in the flue gas. These oxides are hazardous and are the main contributors to the deteriorating quality of ambient air.

Analysis of numerous epidemiological studies clearly indicates an association between air pollution as measured by sulfur dioxide concentrations and health effects of varying severities, particularly among the most susceptible elements of the population. In addition, sulfur dioxide leads to acid rain, which causes extensive damage to plants and is corrosive to many types of materials.

Reduction in the emissions of $SO_2$ has become increasingly more important because of the deteriorating ambient air qualities in many industrial countries. The increasing concern over acid rain, the tightening of emission standards, and the push for the use of more coal to satisfy energy needs, all point to an urgent need for more efficient and more economic processes. Research and development has been intensified in many countries including the United States, England, Germany, Japan, and Russia, as reported, e.g., in (a) D. Bienstock, J. H. Field, S. Katell, and K. D. Plants, "Evaluation of Dry Processes for Removing Sulfur Dioxide from Power Plant Flue Gases", JAPCA, Vol. 15, p. 459 (1965); and (b) J. H. Field, L. W. Brunn, W. P. Haynes and H. E. Benson, "Cost Estimates of Liquid-Scrubbing Processes for Removal of Sulfur Dioxide from Flue Gases", JAPCA, Vol. 7, p. 109 (1957).

U.S. emissions of $So_2$ in the 1960's and 1970's were estimated by various sources to be about 20 million tons per year, about 85% of which resulted from combustion of coal (ranging in sulfur concentration from 0.5–5%) and the remainder from fuel oil (0–5% sulfur). Coal usage is expected to accelerate, due to dwindling reserves of liquid and gaseous fuel, and may lead to some $SO_2$ emissions in the U.S. of 30 million tons by the year 2000, if strong measures are not taken.

The present environmental driving force for sulfur dioxide control are the Clean Air Act amendments, which created a schedule to decrease $SO_2$ emissions from power plants and other major sources, for both new and existing facilities. In 1978, New Source Performance Standards (NSPS) limited the emissions for power plants to 1.2 lb/million BTU when solid fuels are burned. Such a restriction requires 70% $SO_2$ control for a 3% S coal.

Under the Clean Air Act of 1990, the Environmental Protection Agency will assign coal-burning utilities a limited number of rights to emit sulfur dioxide, beginning in 1995. The act mandates that such utilities cut back total emissions of the gas to 8.9 million tons by the year 2000, from 18.9 million tons in 1980.

It will therefore be realized that reduction in the emissions of $SO_2$, $NO_x$, and $CO_2$ has become increasingly more important, because of the deteriorating ambient air qualities in many industrial countries; the heavy fines being levied for failure to comply with the new standards which have been set; the increasing concern over acid rain; the tightening of emission standards, and the push for the use of more coal to satisfy the energy needs, all of which point to an urgent need for more efficient and more economic processes.

In light of the above, there have been suggested four major avenues for reduction of SO$_2$ emission to the atmosphere as a result of coal consumption:

a) reduction of coal consumption;

b) utilization of naturally occurring low sulfur coal;

c) physical coal cleaning utilizing the differences in physical properties between inorganic pyritic sulfur and other coal constituents; and d) flue gas treatment to remove sulfur dioxide from combustion gases.

Since option (a) above is not truly practical, and options (b) and (c) are of limited applicability, the major research effort has been directed to option (d).

A review of the literature, however, has indicated that many of the processes suggested for removing sulfur dioxide from combustion gases involve the use of lime or limestone as a reactant.

A major problem with the use of lime or limestone for reducing atmospheric pollution caused by SO$_2$ is that while lime can provide a sink for large amounts of SO$_2$, it is produced from CaCO$_3$ in a process which evolves CO$_2$:

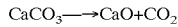

$$CaCO_3 \longrightarrow CaO + CO_2$$

and thus the preparation thereof is in itself a cause for atmospheric pollution caused by CO$_2$. In addition, the preparation of lime consumes energy, which process by itself adds to the pollution.

Another approach to dealing with SO$_2$ emissions involves reversible absorption followed by desorption and then conversion to sulfuric acid or sulfur. This conversion, however, requires the use of reagents and catalysts, and therefore is not preferred, due to the expense thereof.

With this state of the art in mind, there is now provided, according to the present invention, a method for reducing atmospheric pollution caused by a pollutant selected from the group consisting of CO$_2$, SO$_2$ and a mixture thereof, said pollutant being contained in industrial gases being emitted to the atmosphere, through the conversion of CO$_2$ to calcium carbonate and the conversion of SO$_2$ to calcium sulfite using conventionally available calcium salt-containing reactant; said method comprising reacting said pollutant-containing gas, prior to the venting thereof to the atmosphere, with an alkali base and an aqueous liquor, whereby said pollutant reacts with said base and transfers to said liquor and the resulting gas vented to the atmosphere has a reduced pollutant content; and respectively reacting a CO$_2$-loaded liquor with a calcium salt-containing reactant, said reactant comprising phosphate rock, calcium-containing derived products thereof, calcium nitrate, calcium chloride or gypsum to form calcium carbonate, with the proviso that said calcium salt- containing reactant is not derived from calcium carbonate or calcium hydroxide; and reacting an SO$_2$-loaded liquor with a water-soluble calcium salt-containing reactant, said salt being selected from calcium nitrate and calcium chloride to form calcium sulfite;

with the co-formation of a commercially utilizable salt containing an anion from said calcium salt reactant and a cation from said alkali base.

Thus, there is provided a method for reducing atmospheric pollution caused by CO$_2$ contained in industrial gases emitted to the atmosphere, through the conversion of CO$_2$ to CaCO$_3$ utilizing conventionally available calcium salts, said method comprising reacting said CO$_2$-containing gas, prior to the venting thereof to the atmosphere, with an alkali base and an aqueous liquor, whereby CO$_2$ reacts with said base and transfers to said liquor and the resulting gas vented to the atmosphere has a reduced CO$_2$ content, and reacting said CO$_2$-loaded liquor with a calcium salt-containing reactant, said reactant comprising phosphate rock, calcium-containing derived products thereof, calcium nitrate, calcium chloride or gypsum, whereby insoluble calcium carbonate is formed, together with the co-formation of a commercially utilizable salt containing an anion from said calcium salt and a cation from said alkali base.

Said alkali can be selected from NaOH, KOH, ammonia or a source thereof, and preferably said alkali is ammonia or a source thereof.

As indicated hereinabove, the literature mainly describes processes in which the gas to be removed is separated from the flue gas through absorption in a scrubber. In a second operation, the gas is desorbed and condensed (a third step) and the absorber is regenerated.

In contradistinction to the prior art processes, according to the present invention the CO$_2$-containing gas is contacted with an alkali base and an aqueous liquor and then the CO$_2$-loaded liquor is contacted with a calcium-containing reactant as defined. Thus, the present invention is based on absorption of CO$_2$, as opposed to the prior art processes which involve absorption, desorption and condensation. This fact has practical and commercial ramifications, in that the equipment necessary to carry out the present method is simpler, occupies less space and therefore is more applicable to use on off-shore drilling rigs.

The method of the present invention is also commercially attractive in that instead of using an absorber which has to be recycled, it uses a reagent as the absorbent and involves the upgrading of all the components involved to more commercially-desirable components, while enabling the fixation of the CO$_2$ in a product which is environmentally friendly and which is commercially useful.

Since the amounts of CO$_2$ which are produced in industrial waste gases are enormous, any process for dealing therewith is limited by the amount of the reagents available and the by-products produced. As will be realised, in the method of the present invention the by-products which are obtained are salts of potassium, ammonia, nitrogen and phosphorous, which are used as fertilizers by themselves or in combination with other components and for which there is therefore a tremendous commercial demand. By-products of the present process include ammonium nitrate, phosphate or sulfate or potassium nitrate, phosphate or sulfate. Thus, e.g., in 1991, there were produced 7.3 million tons of ammonium nitrate solution, 2.2 million tons of ammonium sulphate and 0.5 million tons of potassium nitrate.

Furthermore, in situations in which the source of calcium is phosphate rock, CO$_2$ in fact serves as an acid source which frees another more valuable anion such as phosphate or nitrate; and in situations in which the source of calcium is a different calcium salt, there is produced a product salt which is also more friendly to the environment, e.g., CaCO$_3$ is preferable over CaSO$_4$. Furthermore, calcium carbonate can be used as a filler in the paper industry and as additives to fertilizers for use in acidic soils.

In addition, as will be realised, since the method of the present invention is not based on desorption, very strong absorbants effecting maximum absorption can be used, such as KOH and ammonia.

In a preferred embodiment, the reactant can comprise Ca(NO$_3$)$_2$ obtained from the reaction of nitric acid with phosphate rock, or said reactant could comprise acidulated calcium phosphate obtained from the reaction of phosphoric acid with phosphate rock, or phosphogypsum obtained from the reaction of sulfuric acid with phosphate rock.

Thus, e.g., using ammonia or a source thereof, the following reactions are envisioned:

$$2NH_4OH+CO_2=(NH_4)_2CO_3+H_2O$$

$$(NH_4)_2CO_3+CaSO_4=(NH_4)_2SO_4+CaCO_3; \qquad a)$$

or $$(NH_4)_2CO_3+CaHPO_4=(NH_4)_2HPO_4+CaCO_3 \; 3(NH_4)_2CO_3+Ca_3(PO_4)_2=2(NH_4)_3PO_4+3CaCO_3; \qquad b)$$

or $$(NH_4)_2CO_3+Ca(NO_3)_2=2NH_4NO_3+CaCO_3 \qquad c)$$

As will be realised, since the calcium carbonate precipitates out from the aqueous solution, said solution can then be further processed to recover therefrom the second product formed by the above reaction, whereafter the mother liquor can be recycled for further use in the present method.

Furthermore, since in the vicinity of turbines there is always waste heat available, the product can be concentrated by heat evaporation without the need for supplying expensive energy input to produce said heat.

Still furthermore, since the absorbant is also a reagent and, in fact, the reaction therewith is exothermic, the overall energy balance of the method is positive and the energy of absorption can enable the concentration of CO$_2$ in the absorbant-containing aqueous liquor.

According to the present invention, there is also provided a method for reducing atmospheric pollution caused by SO$_2$ contained in industrial gases emitted to the atmosphere through the conversion of SO$_2$ to calcium sulfite, utilizing conventionally available, water-soluble, calcium-containing salts, said method comprising reacting said SO$_2$-containing gas, prior to the venting thereof to the atmosphere, with an alkali base and an aqueous liquor, whereby SO$_2$ transfers to said liquor and the resulting gas vented to the atmosphere has a reduced SO$_2$ content; and reacting said SO$_2$-loaded liquor with a water-soluble, calcium salt-containing reactant, said salt being selected from calcium nitrate and calcium chloride, whereby insoluble calcium sulfite is formed, with the co-formation of a commercially utilizable salt containing an anion from said calcium-containing salt and a cation from said alkali base.

Said alkali can be selected from NaOH, KOH, ammonia or a source thereof, and preferably said alkali is ammonia or a source thereof.

Preferably, said reaction with alkali base is carried out at a basic pH higher than 8.

In contradistinction to the prior art processes which reacted acidic So$_2$ with basic lime to form a salt, the present invention first reacts SO$_2$ with an alkali aqueous liquor and then subsequently reacts the resulting product with calcium-containing salts, and therefore the acidity of the SO$_2$ can be used in the present process to release acid values from said calcium-containing salts to effect the upgrading thereof.

As indicated hereinabove, the literature mainly describes processes in which the gas to be removed is separated from the flue gas through absorption in a scrubber. In a second operation the gas is desorbed and condensed (a third step) and the absorber is regenerated, and the sulfur dioxide is oxidized to sulfuric acid or reduced to sulfur.

In U.S. Pat. Nos. 3,775,532; 4,331,640; 4,377,557 and 4,367,205 there are described processes for removing sulfur dioxide from waste gas streams.

All of said patents, however, use an alkali salt as a sorbent salt and do not use a strong alkali base as proposed in the present invention.

U.S. Pat. No. 3,870,781 utilizes a strong base for treating flue gases; however, the process described therein then involves the oxidation of HSO$_3^-$ to form H$^+$ and SO$_4^=$ ions, followed by reaction with CaO. Thus, this process is one in which the base is recycled; however, lime, which is expensive to produce, is used up in the process.

In contradistinction, the process of the present invention provides calcium from a non-expensive source and results in upgraded final products, rendering the present process much more commercially attractive than said prior art process.

In U.S. Pat. No. 4,168,150 there is described a process for the production of fertilizers which inter alia involves sulfur oxide removal in the presence of ammonia and the reaction of a calcium-containing phosphate rock. However, as can be seen, e.g., from column 12, lines 36–40 of said patent, the reaction with SO$_2$ is carried out under acidic conditions and ammonia is not suggested as the primary absorbant, a balance being sought between the acidic pH required for the reaction with phosphate rock, but which acidity is counterproductive to the absorption of SO$_2$, as explained in column 15 of said patent.

Therefore, said patent also does not teach or suggest the two-stage process of the present invention in which absorption is first carried out in a strong base, followed by reaction with a calcium salt under conditions which favor a double decomposition reaction between the reaction product of said pollutant and said strong base and the calcium salt-containing reactant.

According to the present invention, the SO$_2$-containing gas is contacted with an alkali base and an aqueous liquor, and then the SO$_2$-loaded liquor is contacted with a calcium-containing reactant as defined. Thus, the present invention is based on absorption of SO$_2$, as opposed to the prior art processes which involve absorption, desorption and condensation. This fact has practical and commercial ramifications, in that the equipment necessary to carry out the present method is simpler and occupies less space.

The reactant can comprise Ca(NO$_3$)$_2$ obtained from the reaction of nitric acid with phosphate rock, or said reactant could comprise calcium chloride.

Thus, e.g., using ammonia or a source thereof, the following reactions are envisioned:

$$2NH_4OH+SO_2=(NH_4)_2SO_3+H_2O$$

$$(NH_4)_2SO_3+Ca(NO_3)_2=2NH_4NO_3+CaSO_3 \qquad a)$$

$$(NH_4)_2SO_3+CaCl_2=2NH_4Cl+CaSO_3 \qquad b)$$

As will be realised, since the calcium sulfite precipitates out from the aqueous solution, said solution can then be further processed to recover therefrom the second product formed by the above reaction, whereafter the mother liquor can be recycled for further use in the present method.

Furthermore, and as mentioned above, since in the vicinity of turbines there is always waste heat available, the product can be concentrated by heat evaporation without the need for supplying expensive energy input to produce said heat.

In addition, since the absorbent is also a reagent and in fact the reaction therewith is exothermic, the overall energy balance of the method is positive and the energy of absorption in fact can enable the concentration of $SO_2$ in the absorbant-containing aqueous liquor.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

A gaseous mixture of 95% nitrogen and 5% $CO_2$ is bubbled through a column filled with a concentrated aqueous solution containing KOH. The $CO_2$ content of the gas at the outlet of the column is reduced by more than one-half, and the resulting solution containing $KHCO_3$ is then reacted with $Ca_3(PO_4)_2$ to form insoluble $CaCO_3$. The remaining aqueous solution, containing potassium phosphate, is transferred to an evaporator crystallizer to recover the equivalent amount of potassium phosphate.

EXAMPLE 2

A gaseous mixture of 95% nitrogen and 5% $CO_2$ is bubbled through a column filled with a concentrated aqueous solution containing ammonia. The $CO_2$ content of the gas at the outlet of the column is reduced by more than one-half, and the resulting solution, containing $(NH_4)_2CO_3$, is reacted with $CaSO_4$ to form insoluble $CaCO_3$ and $(NH_4)_2SO_4$. The remaining aqueous solution, containing ammonium sulphate, is transferred to an evaporator crystallizer to recover the equivalent amount of ammonium sulphate.

EXAMPLE 3

A gaseous mixture of 95% nitrogen and 5% $CO_2$ is bubbled through a column filled with a concentrated aqueous solution containing $Ca(NO_3)_2$ and ammonia. The $CO_2$ content of the gas at the outlet of the column is reduced by more than one-half, and an insoluble $CaCO_3$ precipitate is formed in situ in the solution and separated therefrom by filtration. The remaining aqueous solution, containing ammonium nitrate, is transferred to an evaporator crystallizer to recover the equivalent amounts of ammonium nitrate.

EXAMPLE 4

A gaseous mixture of 88% nitrogen, 10% $CO_2$ and 2% $SO_2$ is bubbled through a column filled with a concentrated aqueous solution containing KOH. The $SO_2$ content of the gas at the outlet of the column is reduced by more than one-half, and the resulting solution, containing $KHSO_3$, is then reacted with $Ca(NO_3)_2$ to form insoluble $CaSO_3$. The remaining aqueous solution, containing potassium nitrate, is transferred to an evaporator crystallizer to recover the equivalent amount of potassium nitrate.

EXAMPLE 5

A gaseous mixture of 88% nitrogen, 10% $CO_2$ and 2% $SO_2$ is bubbled through a column filled with a concentrated aqueous solution containing ammonia. The $SO_2$ content of the gas at the outlet of the column is reduced by more than one-half, and the resulting solution, containing $(NH_4)_2SO_3$, is reacted with $CaCl_2$ to form insoluble $CaSO_3$ and $2NH_4Cl$. The remaining aqueous solution, containing ammonium chloride, is transferred to an evaporator crystallizer to recover the equivalent amount of ammonium chloride.

EXAMPLE 6

A gaseous mixture of 88% nitrogen, 10% $CO_2$ and 2% $SO_2$ is bubbled through a column filled with a concentrated aqueous solution containing $Ca(NO_3)_2$ and ammonia. The $SO_2$ content of the gas at the outlet of the column is reduced by more than one-half, and an insoluble $CaSO_3$ precipitate is formed in situ in the solution, and separated therefrom by filtration. The remaining aqueous solution, containing ammonium nitrate, is transferred to an evaporator crystallizer to recover the equivalent amounts of ammonium nitrate.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for reducing atmospheric pollution caused by a pollutant selected from the group consisting of $CO_2$, $SO_2$ and a mixture thereof, said pollutant being contained in an industrial gas being emitted to the atmosphere, and said pollutant being removed through the conversion of $CO_2$ to calcium carbonate and the conversion of SO2 into calcium sulfite using a calcium salt containing reactant, said method consisting essentially of:

contacting pollutant containing gas, prior to the venting thereof to the atmosphere, with an alkali base consisting essentially of ammonia in an aqueous liquor, whereby at least 50% of the $CO_2$ content and at least 50% of the $SO_2$ content thereof reacts with substantially all of said ammonia and transfers to said liquor, thereby producing a loaded liquor selected from the group consisting of a $CO_2$ loaded liquor and an $SO_2$ loaded liquor, as well as producing a pollutant-depleted gas;

venting said pollutant-depleted gas to the atmosphere, said pollutant-depleted gas having an $SO_2$ content of less than half and a $CO_2$ content or less than half of that contained in said initial pollutant-containing gas;

respectively reacting said $CO_2$-loaded liquor with a calcium salt containing reactant, selected from the group consisting of phosphate rock, calcium-containing acidulated phosphate rock, calcium nitrate, calcium chloride and gypsum to form calcium carbonate, and reacting said $SO_2$ loaded liquor with a water soluble calcium salt containing reactant selected from the group consisting of calcium nitrate and calcium chloride, to form calcium sulfite, thereby co-forming a commercially utilizable ammonium salt containing an anion from said calcium salt containing reactant and substantially all of the ammonia from said alkali base; and recovering said ammonium salt as a final product.

2. A method according to claim 1, wherein said reactant comprises $Ca(NO_3)_2$ obtained from the reaction of nitric acid with phosphate rock.

3. A method according to claim 1, wherein said reactant comprises acidulated phosphate obtained from the reaction of phosphoric acid with phosphate rock.

4. A method according to claim 1, comprising:

reacting said industrial gas, prior to emission, with an aqueous liquor containing ammonia and a water soluble calcium salt, whereby $SO_2$ transfers to the aqueous liquor calcium sulfite precipitates and a gas released to the atmosphere has a lower $SO_2$ content.

5. A method according to claim 1, wherein said reaction with the ammonia base is carried out at a basic pH higher than 8.

6. The method according to claim 1, further comprising supplying the ammonia containing aqueous alkali liquor and the calcium salt containing reactant to a site of a combustion powered gas turbine which produces the industrial gas.

7. A method according to claim 6, wherein said site is an offshore drilling rig.

8. A method for reducing atmospheric pollution caused by a $CO_2$ pollutant, said pollutant being contained in an industrial gas being emitted to the atmosphere and, said pollutant being removed through the conversion of $CO_2$ to calcium carbonate using a calcium salt containing reactant, said method consisting essentially of:

contacting an initial pollutant-containing gas, prior to the venting thereof to the atmosphere, with an alkali base consisting essentially of ammonia in an aqueous liquor, whereby at least 50% of the $CO_2$ content thereof reacts with substantially all of said ammonia and transfers to said liquor, thereby producing a $CO_2$ loaded liquor as well as producing a pollutant-depleted gas;

venting said pollutant-depleted gas to the atmosphere, said pollutant depleted gas having a $CO_2$ content of less than half of that contained in said initial pollutant-containing gas, reacting said $CO_2$ loaded liquor with a calcium salt containing reactant selected from the group consisting of phosphate rock, calcium-containing acidulated phosphate rock, calcium nitrate, calcium chloride and gypsum to form calcium carbonate, co-forming a commercially utilizable ammonium salt containing an anion from said calcium salt containing reactant and substantially all of the ammonia from said alkali base; and recovering said ammonium salt as a final product.

9. The method according to claim 8, wherein said reactant comprises $Ca(NO_3)_2$ obtained from the reaction of nitric acid with phosphate rock.

10. The method according to claim 8, wherein the reactant comprises acidulated phosphate rock obtained from the reaction of phosphoric acid with phosphate rock.

11. The method according to claim 8, further comprising supplying the ammonia containing aqueous alkali liquor and the calcium salt containing reactant to a site of a combustion powered gas turbine which produces the industrial gas.

12. The method according to claim 11, wherein said site is an offshore drilling rig.

13. The method according to claim 8, further comprising reacting said industrial gas, prior to emission, with an aqueous liquor containing ammonia and a water-soluble calcium salt, whereby $SO_2$ transfers to the aqueous liquor, calcium sulfite precipitates, and the gas released to the atmosphere has a lower $SO_2$ content.

14. The method according to claim 8, wherein said reaction with the alkali liquor is carried out at a basic pH higher than 8.

15. A method for reducing atmospheric pollution caused by a $SO_2$ pollutant contained in an industrial gas being emitted to the atmosphere, and said pollutant being removed through the conversion of $SO_2$ into calcium sulfite using a calcium salt containing reactant, said method consisting essentially of:

contacting an initial pollutant-containing gas, prior to the venting thereof to the atmosphere, with an alkali base consisting essentially of ammonia in an aqueous liquor whereby at least 50% of the $SO_2$ content thereof reacts with substantially all of said ammonia and transfers to said liquor, thereby producing a $SO_2$ loaded liquor as well as producing a pollutant-depleted gas;

venting said pollutant-depleted gas to the atmosphere, said pollutant-depleted gas having a $SO_2$ content of less than half of that contained in said initial pollutant containing gas, reacting said $SO_2$ loaded liquor with a water soluble calcium salt containing reactant selected from the group consisting of calcium nitrate and calcium chloride to form calcium sulphite, co-forming a commercially utilizable ammonium salt containing an anion from said calcium salt containing reactant and substantially all of the ammonia from said alkali base; and recovering said ammonium salt as a final product.

16. The method according to claim 15, wherein the reactant comprises $Ca(NO_3)_2$ obtained from the reaction of nitric acid with phosphate rock.

17. The method according to claim 15, further comprising supplying the ammonia containing aqueous alkali liquor and the calcium salt containing reactant to a site of a combustion powered gas turbine which produces the industrial gas.

18. The method according to claim 15, wherein said site is an offshore drilling rig.

19. The method according to claim 15, further comprising reacting said industrial gas, prior to emission, with an aqueous liquor containing ammonia and a water-soluble calcium salt, whereby $CO_2$ transfers to the aqueous liquor, calcium carbonate precipitates, and the pollutant-depleted gas released to the atmosphere has a lower $SO_2$ content.

20. The method according to claim 15, wherein said reaction with the alkali liquor is carried out at a basic pH higher than 8.

* * * * *